US012670492B2

(12) United States Patent　　(10) Patent No.:　US 12,670,492 B2

Mahadevan et al.　　　　　　　　　(45) Date of Patent:　　Jun. 30, 2026

(54) METHOD, SYSTEM, AND COMPUTER PROGRAM PRODUCT FOR AUTHENTICATING A TRANSACTION USING BIOMETRIC DATA

(71) Applicant: Visa International Service Association, San Francisco, CA (US)

(72) Inventors: Vaishale Sekaripuram Mahadevan, Bangalore (IN); Mohan Kumar Sabapathy, Tamil Nadu (IN); Vijayraj Shanmugaraj, Bangalore (IN); Shrinidhi Sridhar, Tamil Nadu (IN)

(73) Assignee: Visa International Service Association, San Francisco, CA (US)

( * ) Notice: Subject to any disclaimer, the term of this patent is extended or adjusted under 35 U.S.C. 154(b) by 189 days.

(21) Appl. No.: 18/475,286

(22) Filed: Sep. 27, 2023

(65) Prior Publication Data

US 2025/0104053 A1　　Mar. 27, 2025

(51) Int. Cl.
| | |
|---|---|
| *G06Q 40/00* | (2023.01) |
| *G06Q 20/38* | (2012.01) |
| *G06Q 20/40* | (2012.01) |

(52) U.S. Cl.
CPC ......... *G06Q 20/3821* (2013.01); *G06Q 20/40* (2013.01)

(58) Field of Classification Search
CPC ............................ G06Q 20/3821; G06Q 20/40
See application file for complete search history.

(56) References Cited

U.S. PATENT DOCUMENTS

| | | | |
|---|---|---|---|
| 2009/0157560 A1* | 6/2009 | Carter ................ | G06Q 20/3829 |
| | | | 705/500 |
| 2019/0065919 A1* | 2/2019 | Maheshwari ...... | G06K 19/0718 |
| 2019/0288998 A1* | 9/2019 | Johansson ............... | H04L 63/08 |

FOREIGN PATENT DOCUMENTS

| | | | | |
|---|---|---|---|---|
| WO | WO-2009135105 A1 * | 11/2009 | ........... | A61B 5/1172 |
| WO | WO-2018061008 A1 * | 4/2018 | ........... | G06Q 20/325 |

OTHER PUBLICATIONS

RealScan Biometrics (Hereditary Identification of Fingerprints | Pattern Similarities; https://www.fingerprintexpert.in/blog-details/hereditary-identification-of-fingerprints; Apr. 24, 2023) (Year: 2023).*
Aigbogun, Jr. et al., "Fingerprint pattern similarity: a family-based study using novel classification", Anatomy: An International Journal of Experimental and Clinical Anatomy, Aug. 2019, pp. 107-116, vol. 13, Issue 2.

(Continued)

*Primary Examiner* — Mark H Gaw

(74) *Attorney, Agent, or Firm* — The Webb Law Firm

(57)　　　　　ABSTRACT

A computer-implemented method includes: storing first biometric data associated with a first user corresponding to a payment device issued by an issuer system; during a payment transaction initiated with the payment device by a second user different from the first user, receiving second biometric data associated with the second user; in response to receiving the second biometric data, automatically generating a similarity score by executing a biometric algorithm configured to compare the second biometric data to the first biometric data, the similarity score representing a similarity between the second biometric data and the first biometric data; and in response to the similarity score satisfying at least one threshold, automatically authenticating the payment transaction.

12 Claims, 9 Drawing Sheets

(56) References Cited

OTHER PUBLICATIONS

McVean, "You Inherit Part of Your Fingerprint from Your Parents", Office for Science and Society, Jul. 19, 2019, 5 pages, https://www.mcgill.ca/oss/article/did-you-know/you-inherit-part-your-fingerprint-your-parents.

O'Brien et al., "Fingerprint patterns through genetics", Journal of Emerging Investigators, Dec. 2, 2020, pp. 1-5, vol. 2, https://emerginginvestigators.org/articles/fingerprint-patterns-through-genetics/pdf.

Patel et al., "Evaluation of periocular features for kinship verification in the wild", Computer Vision and Image Understanding, 2017, 27 pages, doi: 10.1016/j.cviu.2017.04.009.

Suharjito et al., "Family Relationship Identification by Using Extract Feature of Gray Level Co-occurrence Matrix (GLCM) Based on Parents and Children Fingerprint", International Journal of Electric and Computer Engineering (IJECE), Oct. 2017, pp. 2738-2745, vol. 7, No. 5.

Thales, "EMV card with fingerprint biometrics—Introducing the biometric payment card", 2023, 10 pages, retrieved May 9, 2023, from https://www.thalesgroup.com/en/markets/digital-identity-and-security/banking-payment/cards/emv-biometric-card.

Viera et al., "Automatic Verification of Parent-Child Pairs from Face Images", 2013, In: Ruiz-Shulcloper, J., Sanniti di Baja, G. (eds), Progress in Pattern Recognition, Image Analysis, Computer Vision, and Applications, CIARP 2013, Lecture Notes in Computer Science, pp. 326-333, vol. 8259, Springer, https://doi.org/10.1007/978-3-642-41827-3_41.

Wu et al. "Facial Kinship Verification: A Comprehensive Review and Overlook", International Journal of Computer Vision, Apr. 19, 2022, pp. 1494-1525, vol. 130.

* cited by examiner

600

602 STORE FIRST BIOMETRIC DATA

604 RECEIVE SECOND BIOMETRIC DATA

606 AUTOMATICALLY GENERATE A SIMILARITY SCORE

608 AUTOMATICALLY AUTHENTICATE THE PAYMENT TRANSACTION

METHOD, SYSTEM, AND COMPUTER PROGRAM PRODUCT FOR AUTHENTICATING A TRANSACTION USING BIOMETRIC DATA

BACKGROUND

1. Field

This disclosure relates generally to authenticating transactions and, in non-limiting embodiments or aspects, to methods, systems, and computer program products for authenticating transactions using biometric data.

2. Technical Considerations

A practice among payment device users is to share the payment device among multiple users, and particularly among multiple biologically related users (e.g., parent-child users). However, existing systems rely on inherently insecure means of authenticating the user using the payment device to initiate the transaction. For example, certain existing systems involve the user of the payment device providing a personal identification number (PIN) at the time of the transaction, which requires the inherently insecure practice of data sharing. Other systems require each secondary user (users to whom the payment device was not issued but to whom the primary user would like to allow payment device usage) to go through a cumbersome onboarding process before the secondary user can use the payment device to initiate a payment transaction.

SUMMARY

According to non-limiting embodiments or aspects, provided is a computer-implemented method that includes: storing, with at least one processor, first biometric data associated with a first user corresponding to a payment device issued by an issuer system; during a payment transaction initiated with the payment device by a second user different from the first user, receiving, with at least one processor, second biometric data associated with the second user; in response to receiving the second biometric data, automatically generating, with at least one processor, a similarity score by executing a biometric algorithm configured to compare the second biometric data to the first biometric data, the similarity score representing a similarity between the second biometric data and the first biometric data; and in response to the similarity score satisfying at least one threshold, automatically authenticating, with at least one processor, the payment transaction.

In non-limiting embodiments or aspects, the biometric algorithm may include a biometric inheritance algorithm.

In non-limiting embodiments or aspects, the first biometric data and/or the second biometric data may include fingerprint data.

In non-limiting embodiments or aspects, the first biometric data may include an image of a fingerprint of the first user, where the second biometric data may include an image of a fingerprint of the second user, and where executing the biometric algorithm may include automatically comparing the images of the fingerprint of the first user and the fingerprint of the second user to generate the similarity score.

In non-limiting embodiments or aspects, the payment device may include a biometric sensor.

In non-limiting embodiments or aspects, the second biometric data may be received by the second user placing a finger on the biometric sensor to cause the biometric sensor to collect the second biometric data at a point of sale of the payment transaction.

In non-limiting embodiments or aspects, the payment device may include a data storage device, and the first biometric data and the biometric algorithm may be stored on the data storage device, where a processor of the payment device may automatically execute the biometric algorithm by comparing the second biometric data collected by the biometric sensor to the first biometric data stored on the data storage device using the biometric algorithm stored on the data storage device.

In non-limiting embodiments or aspects, the processor of the payment device may generate the similarity score; and in response to the similarity score satisfying the at least one threshold, the payment device may automatically authenticate the payment transaction by communicating a message to a point of sale device of a merchant system, the message including an indicator that the payment transaction is authenticated.

In non-limiting embodiments or aspects, the second biometric data may be received by the second user placing a finger on a biometric sensor arranged on a point of sale device of a merchant system at a point of sale of the payment transaction.

In non-limiting embodiments or aspects, the payment transaction may be automatically processed to completion over a payment network in response to the payment transaction being authenticated.

In non-limiting embodiments or aspects, the first biometric data and/or the second biometric data may include facial data.

In non-limiting embodiments or aspects, the first biometric data may include an image of a face of the first user, and the second biometric data may include an image of a face of the second user, where executing the biometric algorithm may include automatically comparing the images of the face of the first user and the face of the second user to generate the similarity score.

In non-limiting embodiments or aspects, the second user may be a biological descendant of the first user.

According to non-limiting embodiments or aspects, provided is a payment device issued to a first user, the payment device configured to initiate electronic payment transactions and including: a card including: a biometric sensor embedded in the card, the biometric sensor configured to collect biometric data from a user engaging with the biometric sensor; a data storage device embedded in the card, the data storage device storing an identifier of the payment device, first biometric data associated with the first user; and a biometric algorithm configured to compare biometric data; and a communication device embedded in the card, the communication device for initiating an electronic payment transaction with a point of sale device of a merchant system by communicating a message including the identifier to the point of sale device.

In non-limiting embodiments or aspects, the biometric sensor may include a fingerprint sensor and/or a face sensor.

In non-limiting embodiments or aspects, the biometric algorithm may include a biometric inheritance algorithm.

In non-limiting embodiments or aspects, in response to a payment transaction being initiated with the payment device by a second user different from the first user, the payment device may be configured to: receive second biometric data associated with the second user by the second user engaging with the biometric sensor; and in response to receiving the second biometric data, automatically generate a similarity score by executing the biometric algorithm configured to compare the second biometric data to the first biometric data, the similarity score representing a similarity between the second biometric data and the first biometric data.

In non-limiting embodiments or aspects, in response to the similarity score satisfying a threshold, the payment device may automatically authenticate the payment transaction by communicating a message to a point of sale device of a merchant system, the message including an indicator that the payment transaction is authenticated.

In non-limiting embodiments or aspects, the first biometric data may include an image of a fingerprint of the first user, where the second biometric data may include an image of a fingerprint of the second user, and where executing the biometric algorithm may include automatically comparing the images of the fingerprint of the first user and the fingerprint of the second user to generate the similarity score.

In non-limiting embodiments or aspects, the payment device may include a credit card or a debit card.

According to non-limiting embodiments or aspects, provided is a system including at least one processor programmed or configured to: store first biometric data associated with a first user corresponding to a payment device issued by an issuer system; during a payment transaction initiated with the payment device by a second user different from the first user, receive second biometric data associated with the second user; in response to receiving the second biometric data, automatically generate a similarity score by executing a biometric algorithm configured to compare the second biometric data to the first biometric data, the similarity score representing a similarity between the second biometric data and the first biometric data; and in response to the similarity score satisfying at least one threshold, automatically authenticate the payment transaction.

In non-limiting embodiments or aspects, the biometric algorithm may include a biometric inheritance algorithm.

In non-limiting embodiments or aspects, the first biometric data and/or the second biometric data may include fingerprint data.

In non-limiting embodiments or aspects, the first biometric data may include an image of a fingerprint of the first user, where the second biometric data may include an image of a fingerprint of the second user, and where executing the biometric algorithm may include automatically comparing the images of the fingerprint of the first user and the fingerprint of the second user to generate the similarity score.

In non-limiting embodiments or aspects, the payment device may include a biometric sensor.

In non-limiting embodiments or aspects, the second biometric data may be received by the second user placing a finger on the biometric sensor to cause the biometric sensor to collect the second biometric data at a point of sale of the payment transaction.

In non-limiting embodiments or aspects, the payment device may include a data storage device, and the first biometric data and the biometric algorithm may be stored on the data storage device, where a processor of the payment device may automatically execute the biometric algorithm by comparing the second biometric data collected by the biometric sensor to the first biometric data stored on the data storage device using the biometric algorithm stored on the data storage device.

In non-limiting embodiments or aspects, the processor of the payment device may generate the similarity score; and in response to the similarity score satisfying the at least one threshold, the payment device may automatically authenticate the payment transaction by communicating a message to a point of sale device of a merchant system, the message including an indicator that the payment transaction is authenticated.

In non-limiting embodiments or aspects, the second biometric data may be received by the second user placing a finger on a biometric sensor arranged on a point of sale device of a merchant system at a point of sale of the payment transaction.

In non-limiting embodiments or aspects, the payment transaction may be automatically processed to completion over a payment network in response to the payment transaction being authenticated.

In non-limiting embodiments or aspects, the first biometric data and/or the second biometric data may include facial data.

In non-limiting embodiments or aspects, the first biometric data may include an image of a face of the first user, and the second biometric data may include an image of a face of the second user, where executing the biometric algorithm may include automatically comparing the images of the face of the first user and the face of the second user to generate the similarity score.

In non-limiting embodiments or aspects, the second user may be a biological descendant of the first user.

According to non-limiting embodiments or aspects, provided is a computer program product including at least one non-transitory computer-readable medium including one or more instructions that, when executed by at least one processor, cause the at least one processor to: store first biometric data associated with a first user corresponding to a payment device issued by an issuer system; during a payment transaction initiated with the payment device by a second user different from the first user, receive second biometric data associated with the second user; in response to receiving the second biometric data, automatically generate a similarity score by executing a biometric algorithm configured to compare the second biometric data to the first biometric data, the similarity score representing a similarity between the second biometric data and the first biometric data; and in response to the similarity score satisfying at least one threshold, automatically authenticate the payment transaction.

In non-limiting embodiments or aspects, the biometric algorithm may include a biometric inheritance algorithm.

In non-limiting embodiments or aspects, the first biometric data and/or the second biometric data may include fingerprint data.

In non-limiting embodiments or aspects, the first biometric data may include an image of a fingerprint of the first user, where the second biometric data may include an image of a fingerprint of the second user, and where executing the biometric algorithm may include automatically comparing the images of the fingerprint of the first user and the fingerprint of the second user to generate the similarity score.

In non-limiting embodiments or aspects, the payment device may include a biometric sensor.

In non-limiting embodiments or aspects, the second biometric data may be received by the second user placing a finger on the biometric sensor to cause the biometric sensor to collect the second biometric data at a point of sale of the payment transaction.

In non-limiting embodiments or aspects, the payment device may include a data storage device, and the first biometric data and the biometric algorithm may be stored on the data storage device, where a processor of the payment device may automatically execute the biometric algorithm by comparing the second biometric data collected by the biometric sensor to the first biometric data stored on the data storage device using the biometric algorithm stored on the data storage device.

In non-limiting embodiments or aspects, the processor of the payment device may generate the similarity score; and in response to the similarity score satisfying the at least one threshold, the payment device may automatically authenticate the payment transaction by communicating a message to a point of sale device of a merchant system, the message including an indicator that the payment transaction is authenticated.

In non-limiting embodiments or aspects, the second biometric data may be received by the second user placing a finger on a biometric sensor arranged on a point of sale device of a merchant system at a point of sale of the payment transaction.

In non-limiting embodiments or aspects, the payment transaction may be automatically processed to completion over a payment network in response to the payment transaction being authenticated.

In non-limiting embodiments or aspects, the first biometric data and/or the second biometric data may include facial data.

In non-limiting embodiments or aspects, the first biometric data may include an image of a face of the first user, and the second biometric data may include an image of a face of the second user, where executing the biometric algorithm may include automatically comparing the images of the face of the first user and the face of the second user to generate the similarity score.

In non-limiting embodiments or aspects, the second user may be a biological descendant of the first user.

Other non-limiting embodiments or aspects will be set forth in the following numbered clauses:

Clause 1: A computer-implemented method comprising: storing, with at least one processor, first biometric data associated with a first user corresponding to a payment device issued by an issuer system; during a payment transaction initiated with the payment device by a second user different from the first user, receiving, with at least one processor, second biometric data associated with the second user; in response to receiving the second biometric data, automatically generating, with at least one processor, a similarity score by executing a biometric algorithm configured to compare the second biometric data to the first biometric data, the similarity score representing a similarity between the second biometric data and the first biometric data; and in response to the similarity score satisfying at least one threshold, automatically authenticating, with at least one processor, the payment transaction.

Clause 2: The computer-implemented method of clause 1, wherein the biometric algorithm comprises a biometric inheritance algorithm.

Clause 3: The computer-implemented method of clause 1 or 2, wherein the first biometric data and/or the second biometric data comprise fingerprint data.

Clause 4: The computer-implemented method of any of clauses 1-3, wherein the first biometric data comprises an image of a fingerprint of the first user, wherein the second biometric data comprises an image of a fingerprint of the second user, and wherein executing the biometric algorithm comprises automatically comparing the images of the fingerprint of the first user and the fingerprint of the second user to generate the similarity score.

Clause 5: The computer-implemented method of any of clauses 1-4, wherein the payment device comprises a biometric sensor.

Clause 6: The computer-implemented method of any of clauses 1-5, wherein the second biometric data is received by the second user placing a finger on the biometric sensor to cause the biometric sensor to collect the second biometric data at a point of sale of the payment transaction.

Clause 7: The computer-implemented method of any of clauses 1-6, wherein the payment device comprises a data storage device, and the first biometric data and the biometric algorithm are stored on the data storage device, wherein a processor of the payment device automatically executes the biometric algorithm by comparing the second biometric data collected by the biometric sensor to the first biometric data stored on the data storage device using the biometric algorithm stored on the data storage device.

Clause 8: The computer-implemented method of any of clauses 1-7, wherein the processor of the payment device generates the similarity score; and in response to the similarity score satisfying the at least one threshold, the payment device automatically authenticates the payment transaction by communicating a message to a point of sale device of a merchant system, the message comprising an indicator that the payment transaction is authenticated.

Clause 9: The computer-implemented method of any of clauses 1-8, wherein the second biometric data is received by the second user placing a finger on a biometric sensor arranged on a point of sale device of a merchant system at a point of sale of the payment transaction.

Clause 10: The computer-implemented method of any of clauses 1-9, wherein the payment transaction is automatically processed to completion over a payment network in response to the payment transaction being authenticated.

Clause 11: The computer-implemented method of any of clauses 1-10, wherein the first biometric data and/or the second biometric data comprise facial data.

Clause 12: The computer-implemented method of any of clauses 1-11, wherein the first biometric data comprises an image of a face of the first user, and the second biometric data comprises an image of a face of the second user, wherein executing the biometric algorithm comprises automatically comparing the images of the face of the first user and the face of the second user to generate the similarity score.

Clause 13: The computer-implemented method of any of clauses 1-12, wherein the second user is a biological descendant of the first user.

Clause 14: A payment device issued to a first user, the payment device configured to initiate electronic payment transactions and comprising: a card comprising: a biometric sensor embedded in the card, the biometric sensor configured to collect biometric data from a user engaging with the biometric sensor; a data storage device embedded in the card, the data storage device storing an identifier of the payment device, first biometric data associated with the first user; and a biometric algorithm configured to compare biometric data; and a communication device embedded in the card, the communication device for initiating an electronic payment transaction with a point of sale device of a merchant system by communicating a message comprising the identifier to the point of sale device.

Clause 15: The payment device of clause 14, wherein the biometric sensor comprises a fingerprint sensor and/or a face sensor.

Clause 16: The payment device of clause 14 or 15, wherein the biometric algorithm comprises a biometric inheritance algorithm.

Clause 17: The payment device of any of clauses 14-16, wherein: in response to a payment transaction being initiated with the payment device by a second user different from the first user, the payment device is configured to: receive second biometric data associated with the second user by the second user engaging with the biometric sensor; and in response to receiving the second biometric data, automatically generate a similarity score by executing the biometric algorithm configured to compare the second biometric data to the first biometric data, the similarity score representing a similarity between the second biometric data and the first biometric data.

Clause 18: The payment device of any of clauses 14-17, wherein in response to the similarity score satisfying a threshold, the payment device automatically authenticates the payment transaction by communicating a message to a point of sale device of a merchant system, the message comprising an indicator that the payment transaction is authenticated.

Clause 19: The payment device of any of clauses 14-18, wherein the first biometric data comprises an image of a fingerprint of the first user, wherein the second biometric data comprises an image of a fingerprint of the second user, and wherein executing the biometric algorithm comprises automatically comparing the images of the fingerprint of the first user and the fingerprint of the second user to generate the similarity score.

Clause 20: The payment device of any of clauses 14-19, wherein the payment device comprises a credit card or a debit card.

Clause 21: A system comprising at least one processor programmed or configured to: store first biometric data associated with a first user corresponding to a payment device issued by an issuer system; during a payment transaction initiated with the payment device by a second user different from the first user, receive second biometric data associated with the second user; in response to receiving the second biometric data, automatically generate a similarity score by executing a biometric algorithm configured to compare the second biometric data to the first biometric data, the similarity score representing a similarity between the second biometric data and the first biometric data; and in response to the similarity score satisfying at least one threshold, automatically authenticate the payment transaction.

Clause 22: The system of clause 21, wherein the biometric algorithm comprises a biometric inheritance algorithm.

Clause 23: The system of clause 21 or 22, wherein the first biometric data and/or the second biometric data comprise fingerprint data.

Clause 24: The system of any of clauses 21-23, wherein the first biometric data comprises an image of a fingerprint of the first user, wherein the second biometric data comprises an image of a fingerprint of the second user, and wherein executing the biometric algorithm comprises automatically comparing the images of the fingerprint of the first user and the fingerprint of the second user to generate the similarity score.

Clause 25: The system of any of clauses 21-24, wherein the payment device comprises a biometric sensor.

Clause 26: The system of any of clauses 21-25, wherein the second biometric data is received by the second user placing a finger on the biometric sensor to cause the biometric sensor to collect the second biometric data at a point of sale of the payment transaction.

Clause 27: The system of any of clauses 21-26, wherein the payment device comprises a data storage device, and the first biometric data and the biometric algorithm are stored on the data storage device, wherein a processor of the payment device automatically executes the biometric algorithm by comparing the second biometric data collected by the biometric sensor to the first biometric data stored on the data storage device using the biometric algorithm stored on the data storage device.

Clause 28: The system of any of clauses 21-27, wherein the processor of the payment device generates the similarity score; and in response to the similarity score satisfying the at least one threshold, the payment device automatically authenticates the payment transaction by communicating a message to a point of sale device of a merchant system, the message comprising an indicator that the payment transaction is authenticated.

Clause 29: The system of any of clauses 21-28, wherein the second biometric data is received by the second user placing a finger on a biometric sensor arranged on a point of sale device of a merchant system at a point of sale of the payment transaction.

Clause 30: The system of any of clauses 21-29, wherein the payment transaction is automatically processed to completion over a payment network in response to the payment transaction being authenticated.

Clause 31: The system of any of clauses 21-30, wherein the first biometric data and/or the second biometric data comprise facial data.

Clause 32: The system of any of clauses 21-31, wherein the first biometric data comprises an image of a face of the first user, and the second biometric data comprises an image of a face of the second user, wherein executing the biometric algorithm comprises automatically comparing the images of the face of the first user and the face of the second user to generate the similarity score.

Clause 33: The system of any of clauses 21-32, wherein the second user is a biological descendant of the first user.

Clause 34: A computer program product comprising at least one non-transitory computer-readable medium including one or more instructions that, when executed by at least one processor, cause the at least one processor to: store first biometric data associated with a first user corresponding to a payment device issued by an issuer system; during a payment transaction initiated with the payment device by a second user different from the first user, receive second biometric data associated with the second user; in response to receiving the second biometric data, automatically generate a similarity score by executing a biometric algorithm configured to compare the second biometric data to the first biometric data, the similarity score representing a similarity between the second biometric data and the first biometric data; and in response to the similarity score satisfying at least one threshold, automatically authenticate the payment transaction.

Clause 35: The computer program product of clause 34, wherein the biometric algorithm comprises a biometric inheritance algorithm.

Clause 36: The computer program product of clause 34 or 35, wherein the first biometric data and/or the second biometric data comprise fingerprint data.

Clause 37: The computer program product of any of clauses 34-36, wherein the first biometric data comprises an image of a fingerprint of the first user, wherein the second biometric data comprises an image of a fingerprint of the second user, and wherein executing the biometric algorithm comprises automatically comparing the images of the fingerprint of the first user and the fingerprint of the second user to generate the similarity score.

Clause 38: The computer program product of any of clauses 34-37, wherein the payment device comprises a biometric sensor.

Clause 39: The computer program product of any of clauses 34-38, wherein the second biometric data is received by the second user placing a finger on the biometric sensor to cause the biometric sensor to collect the second biometric data at a point of sale of the payment transaction.

Clause 40: The computer program product of any of clauses 34-39, wherein the payment device comprises a data storage device, and the first biometric data and the biometric algorithm are stored on the data storage device, wherein a processor of the payment device automatically executes the biometric algorithm by comparing the second biometric data collected by the biometric sensor to the first biometric data stored on the data storage device using the biometric algorithm stored on the data storage device.

Clause 41: The computer program product of any of clauses 34-40, wherein the processor of the payment device generates the similarity score; and in response to the similarity score satisfying the at least one threshold, the payment device automatically authenticates the payment transaction by communicating a message to a point of sale device of a merchant system, the message comprising an indicator that the payment transaction is authenticated.

Clause 42: The computer program product of any of clauses 34-41, wherein the second biometric data is received by the second user placing a finger on a biometric sensor arranged on a point of sale device of a merchant system at a point of sale of the payment transaction.

Clause 43: The computer program product of any of clauses 34-42, wherein the payment transaction is automatically processed to completion over a payment network in response to the payment transaction being authenticated.

Clause 44: The computer program product of any of clauses 34-43, wherein the first biometric data and/or the second biometric data comprise facial data.

Clause 45: The computer program product of any of clauses 34-44, wherein the first biometric data comprises an image of a face of the first user, and the second biometric data comprises an image of a face of the second user, wherein executing the biometric algorithm comprises automatically comparing the images of the face of the first user and the face of the second user to generate the similarity score.

Clause 46: The computer program product of any of clauses 34-45, wherein the second user is a biological descendant of the first user.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
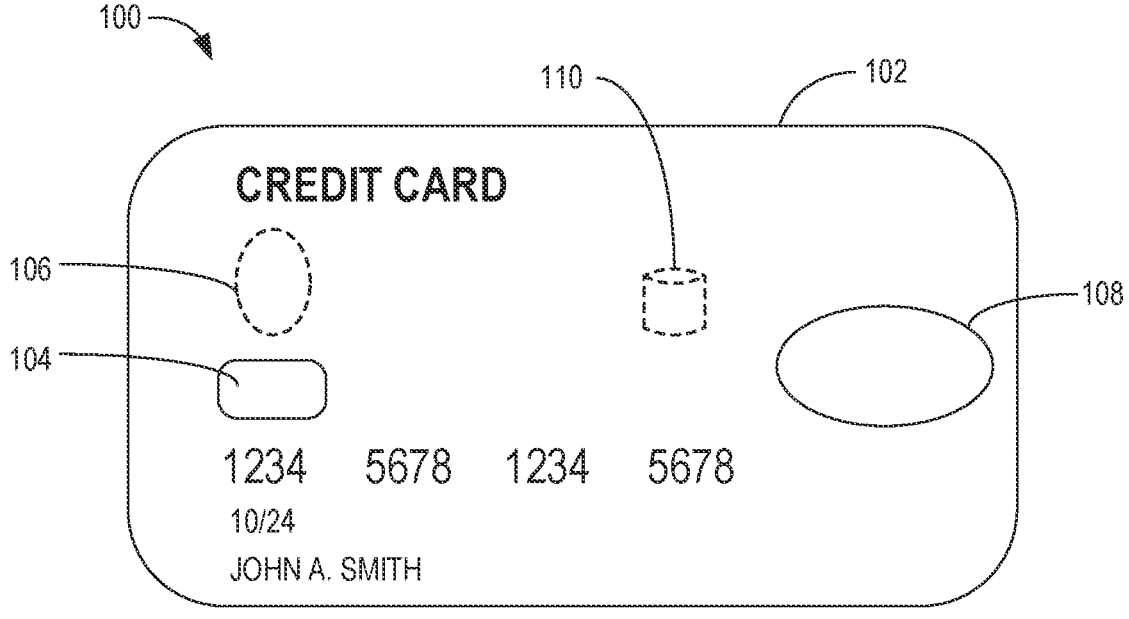
FIGS. 1-2 are schematic diagrams of payment devices according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account identifier" may include one or more primary account numbers (PAN), tokens, or other identifiers associated with a customer account. For example, account identifiers in Real Time Payment (RTP) transactions may include identifiers for sender accounts (called debtor accounts) and identifiers for receiver accounts (called creditor accounts). Account identifiers may be alphanumeric or any combination of characters and/or symbols.

Tokens may be associated with a PAN, debtor account identifier, creditor account identifier, or other original account identifier in one or more data structures (e.g., one or more databases, and/or the like) such that they may be used to conduct a transaction without directly using the original account identifier. In some examples, an original account identifier may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" or "user device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server computer, or other form of non-mobile computer.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a PAN, to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

The term "processor," as used herein, may represent any type of processing unit, such as a single processor having one or more cores, one or more cores of one or more processors, multiple processors each having one or more cores, and/or other arrangements and combinations of processing units. Reference to "at least one processor" can refer to a previously-recited processor or a different processor.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects described herein relate to systems, methods, and computer program products for authenticating a transaction using biometric data. Non-limiting embodiments or aspects automatically execute a biometric algorithm configured to compare biometric data (e.g., fingerprint data, facial data, and the like) and generate a similarity score. The similarity score may represent a similarity between the biometric data compared by the biometric algorithm. The biometric algorithm executed may include a biometric inheritance algorithm that determines whether the users associated with the biometric data being compared are biologically related, such as one user being a biological descendant of another user (e.g., parent-child, grandparent-child, and the like).

Non-limiting embodiments or aspects integrate the biometric algorithm into the processing of payment transactions (e.g. electronic payment transactions), in order to authenticate the user initiating the payment transaction using the payment device. A biometric sensor may be used to collect biometric data from the primary user of the payment device (e.g., the user to whom the payment device was issued). The system may enable secondary users who are biologically related to the primary issuer to initiate payment transactions using the payment device by authenticating the user during processing of the transaction. A biometric sensor may be used to collect biometric data from the secondary user during the payment transaction and apply the biometric algorithm to determine whether the secondary user is biologically related to the primary user, and automatically authenticate the transaction if so. The biometric sensor may be embedded in the payment device of the user, a component of the merchant POS device, and/or the like. Payment networks integrating this biometric-related technology in the payment process address the technical limitations of existing payment networks that either cannot determine whether a secondary user is authorized to use the payment device at all or cannot do so without unsecure data sharing between the primary and secondary user. This also reduces storage and/or processing requirements associated with analyzing numerous sets of biometric data.

Figure 2:
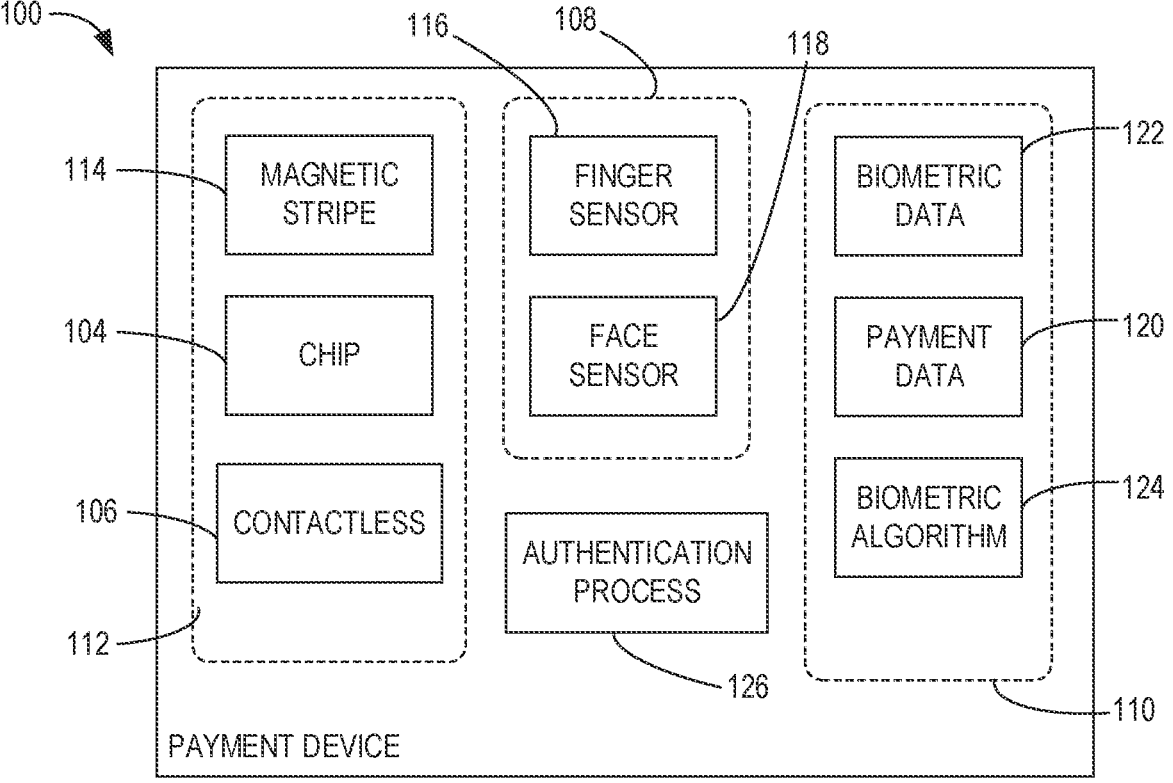

Referring to FIGS. 1-2, payment devices 100 are shown according to some non-limiting embodiments or aspects. The payment device 100 may be a credit card or a debit card issued to a user by an issuer system. The payment device 100 may include a physical card 102. The payment device 100 may comprise a communication device 112 by which the payment device 100 may communicate with a merchant system (e.g. a merchant POS device) to initiate a payment transaction. For example, the payment device 100 may comprise a magnetic stripe 114 embedded on the card 102 (not shown) that may communicate with the merchant POS device using a magnetic stripe protocol. For example, the payment device 100 may comprise a chip 104 (e.g., an EMV chip) embedded in the card 102 that may communicate with the merchant POS device using a chip protocol. For example, the payment device 100 may comprise a contactless transmitter 106 (e.g., an NFC, Bluetooth®, RFID, or other contactless communication transmitter) embedded in the card 102 that may communicate with the merchant POS device using a contactless protocol.

With continued reference to FIGS. 1-2, the payment device may comprise a biometric sensor 108. The biometric sensor 108 may be embedded on the card 102 in some non-limiting embodiments or aspects. The biometric sensor 108 may be configured to collect (e.g., sense) biometric data when engaged with a user. The biometric data may comprise any data capable of identifying an individual by means of their unique physical characteristics. Non-limiting examples of biometric data may include fingerprints of a user's finger, iris scans of a user's eye, facial scans of a user's face, and/or the like. In some non-limiting embodiments or aspects, the biometric sensor 108 is a fingerprint sensor 116 configured to collect fingerprint biometric data of a user when contacted by the user's fingerprint. In some non-limiting embodiments or aspects, the biometric sensor 108 is a face sensor 118 configured to collect facial biometric data of a user when the sensor is arranged with respect to the user's face.

The payment device 100 may further comprise a data storage device 110. The data storage device 110 may be embedded in the payment device 100. The data storage device 110 may store payment data 120 of the payment device 100. The payment data 120 may comprise payment credentials of the payment device 100, such as a PAN, token, expiration data, cvv code, and/or the like of the payment device 100. The payment data 120 may be an identifier uniquely identifying the payment device 100. The payment data 120 may be communicated to the merchant POS device during initiation of a payment transaction with the payment device 100 by at least one of the communication devices 112 (e.g., magnetic stripe 114, chip 104, contactless 106).

The data storage device 110 may store biometric data 122 of at least one user of the payment device 100. For example, during an onboarding process, the user (e.g., a primary user as previously defined) may engage with the biometric sensor 108 to enable the biometric sensor 108 to collect biometric data 122 of the user. The biometric data 122 collected during this onboarding process may be stored on the data storage device 110. The biometric data 122 of a plurality of primary users of the payment device 100 may be stored on the data storage device 110. In some non-limiting embodiments, biometric data 122 collected by the biometric sensor 108 of a user (e.g., a secondary user as previously defined) during a payment transaction to authenticate the user may be stored on the data storage device 110.

With continued reference to FIGS. 1-2, the data storage device 110 may also store a biometric algorithm 124. The biometric algorithm 124 may be any algorithm that automatically analyzes biometric data 122 input to the biometric algorithm 124. The biometric algorithm 124 may be any algorithm that, when executed, generates a similarity score between two different biometric inputs of the biometric data 122 (e.g., between two fingerprints or facial scans of different users) by comparing the biometric data 122. The similarity score may represent a similarity between the compared biometric data 122. The biometric algorithm 124 may comprise a biometric inheritance algorithm that when executed determines whether two individuals are (or likely are) biologically related to one another based on the biometric data 124 input thereto.

Non-limiting examples of biometric inheritance algorithms that may be used in the present disclosure include exemplary fingerprint biometric inheritance algorithms and/ or techniques described in: Aigbogun et al., "Fingerprint pattern similarity: a family-based study using novel classification", Anatomy: An International Journal of Experimental and Clinical Anatomy, Volume 13, Issue 2, pages 107-116 (August 2019); McVean, "You Inherit Part of Your Fingerprint from Your Parents", Office for Science and Society (OSS) (Jul. 19, 2019); O'Brien et al., "Fingerprint patterns through genetics", Journal of Emerging Investigators, Vol. 2, pages 1-5 (Dec. 2, 2020); and Suharjito et al., "Family Relationship Identification by Using Extract Feature of Gray Level Co-occurrence Matrix (GLCM) Based on Parents and Children Fingerprint", International Journal of Electric and Computer Engineering (IJECE), Vo. 7, No. 5, pages 2738-2745 (October 2017).

An exemplary fingerprint biometric inheritance algorithm that can be employed is a Gray Level Co-occurrence Matrix (GLCM) to identify the correspondence relations between two input fingerprints (A GLCM is established over an image to be the distribution of co-occurrence values at a given offset). This algorithm may use feature extraction methods on the input fingerprints, the value of which is normalized. The thus obtained feature values may be compared to output a correlation coefficient.

Non-limiting examples of biometric inheritance algorithms that may be used in the present disclosure include exemplary facial and/or periocular (e.g., iris) biometric inheritance algorithms and/or techniques described in: Patel et al., "Evaluation of periocular features for kinship verification in the wild", Computer Vision and Image Understanding (2017), doi: 10.1016/j.cviu.2017.04.009; Viera et al. "Automatic Verification of Parent-Child Pairs from Face Images" (2013). In: Ruiz-Shulcloper, J., Sanniti di Baja, G. (eds) Progress in Pattern Recognition, Image Analysis, Computer Vision, and Applications. CIARP 2013. Lecture Notes in Computer Science, vol 8259. Springer, Berlin, Heidelberg. https://doi.org/10.1007/978-3-642-41827-3_41; and Wu et al. "Facial Kinship Verification: A Comprehensive Review and Overlook", International Journal of Computer Vision Volume 130, pages 1494-1525 (Apr. 19, 2022).

An exemplary facial and/or periocular biometric inheritance algorithm that can be employed involves training complex neural networks on test data (comprising labelled parent-child facial/periocular image pairs). These trained neural networks in turn can be used to predict kinship given the aforementioned biometric input. The output may be a value between 0 and 1, denoting the probability of a kinship between the two given inputs (parent and child face/periocular images).

With continued reference to FIGS. 1-2, the payment device 100 may further comprise an authentication processor 126 programmed or configured to automatically generate an authentication decision (e.g., to authenticate or decline to authenticate) for the payment transaction. The authentication processor 126 may generate the authentication decision based on the similarity score generated by the biometric algorithm 124. The authentication decision may be transmitted to the merchant POS device during processing of the payment transaction. In some non-limiting embodiments or aspects, the authentication processor 126 may, in response to the similarity score satisfying a threshold (e.g., meeting and/or exceeding a dynamic or predetermined threshold value), automatically authenticate the payment transaction by communicating a message to the merchant POS device, the message comprising an indicator that the payment transaction is authenticated.

With continued reference to FIGS. 1-2, the payment device 100 may be a physical payment card (e.g., a credit card) as depicted in FIG. 1. However, it will be appreciated that the payment device 100 in some non-limiting embodiments or aspects may comprise a user device (e.g., a smartphone or other computing device) of the user storing payment credentials of a physical payment card that enable the user device to initiate a payment transaction. In such embodiments, the user device may comprise, for example, at least one of the contactless transmitter 106; biometric sensor 108 (e.g., finger sensor 116 and/or face sensor 118); data storage device 110 storing payment data 120, biometric data 122, and/or biometric algorithm 124, and authentication processor 126.

Figure 3:
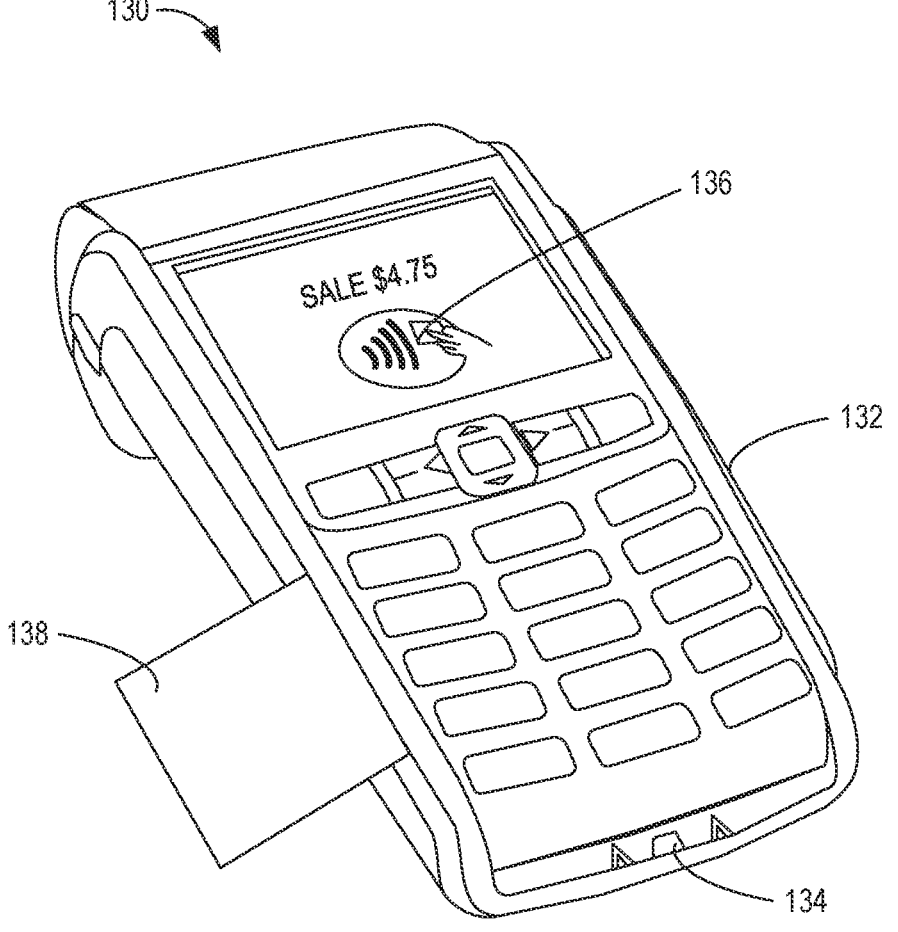
FIG. 3 is a schematic diagram of a merchant point-of-sale device according to some non-limiting embodiments or aspects.

Referring to FIG. 3, a merchant POS device 130 is shown according to some non-limiting embodiments or aspects. The POS device 130 may be a component of a merchant system of a merchant engaging in payment transactions with users. The POS device 130 may be configured to engage with payment devices 100 (from FIGS. 1-2) of users to initiate payment transactions. The POS device 130 may be arranged at a physical location of the merchant.

Referring to FIGS. 1-3, the POS device 130 may have a communication input with which the communication device 112 of the payment device 100 may engage to initiate the payment transaction. For example, the POS device 130 may comprise a magnetic stripe reader 132 configured to engage with the magnetic stripe 114 of the payment device 100. For example, the POS device 130 may additionally and/or alternatively comprise a chip reader 134 configured to engage with the chip 104 of the payment device 100. For example, the POS device 130 may additionally and/or alternatively comprise a contactless reader 136 configured to engage with the contactless transmitter 106 of the payment device 100. The communication input of the POS device 130 engaging with the communication device 112 of the payment device 100 may enable the payment device 100 and POS device 130 to communicate with one another to collect and/or transmit data used to process the payment transaction. For example, the payment device 100 may transmit at least one of the payment data 120, the biometric data 122, the authentication decision, and the like to the POS device 130 in a transaction request message containing data fields containing the above-referenced data.

Referring again to FIG. 3, in some non-limiting embodiments or aspects, the POS device 130 may comprise a biometric sensor 138. The biometric sensor 138 of the POS device 130 may have the same or similar characteristics compared to the biometric sensor 108 described in connection with the payment device 100 (of FIGS. 1-2), and may, for example, comprise a finger sensor and/or a face sensor. In some non-limiting embodiments or aspects, the POS device 130 may collect the biometric data of the user (e.g., during the payment transaction) by the biometric sensor 138 instead of or in addition to the biometric data being collected by the payment device 100. The user engaging with the POS device 130 at the merchant location (and point-of sale) may use the biometric sensor 138 thereof during the payment transaction to provide the biometric data to the POS device 130.

Figure 4A:
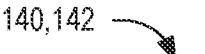
FIGS. 4A-4B are schematic diagrams of systems for authenticating transactions using biometric data according to some non-limiting embodiments or aspects.
Figure 4A:
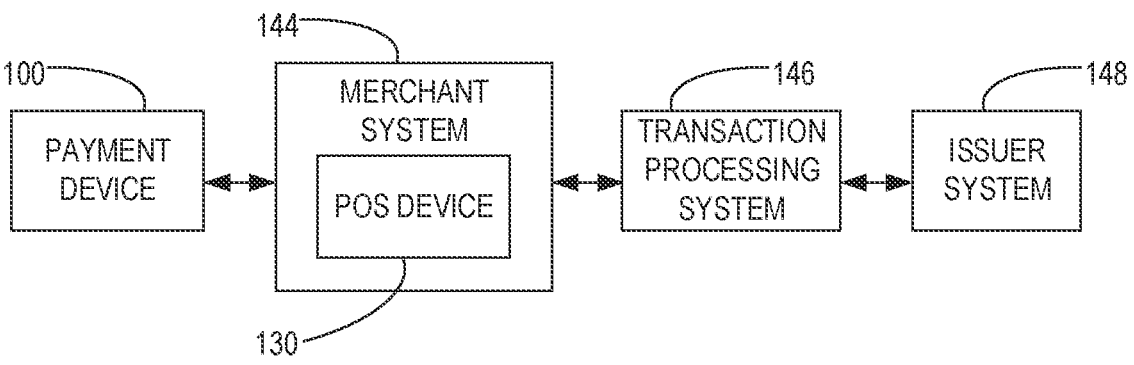
Figure 4B:
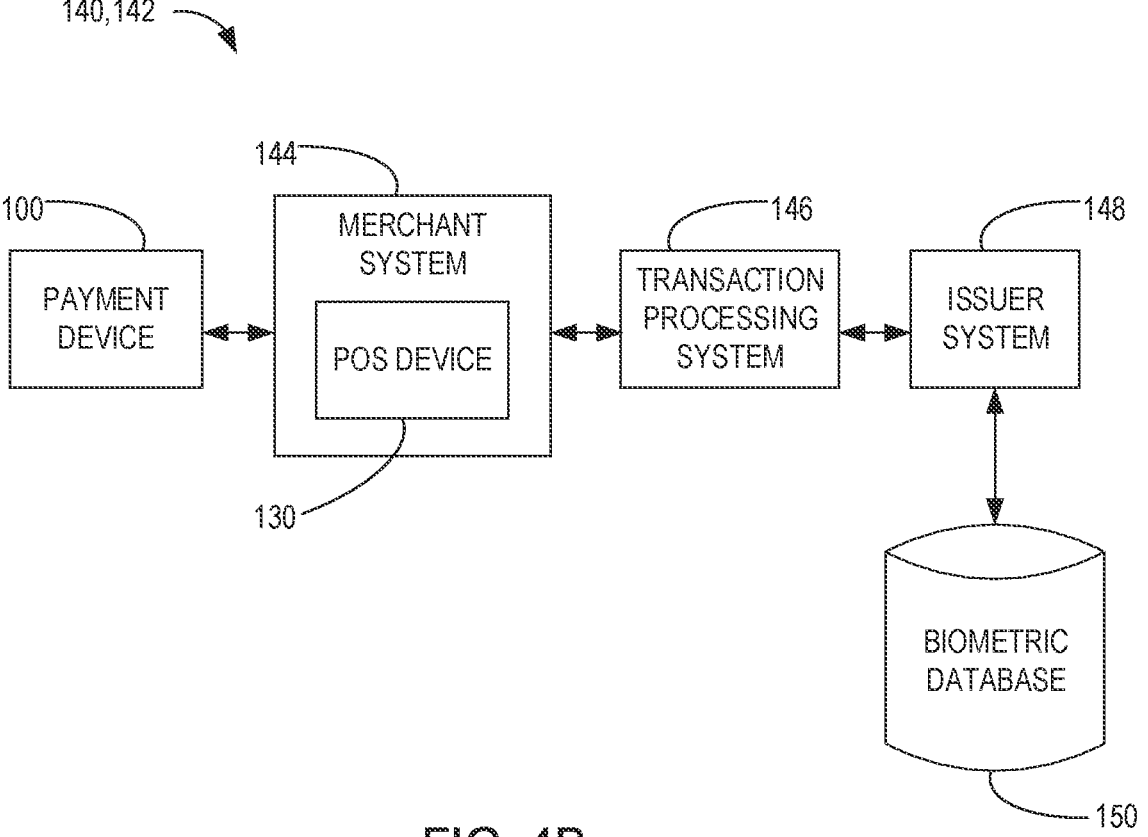

Referring to FIGS. 4A-4B, systems 140 are shown for authenticating transactions using biometric data, according to some non-limiting embodiments or aspects. The systems 140 may process electronic payment transactions over an electronic payment processing network (EPPN) 142 by the user engaging the payment device 100 with components of the EPPN 142. The EPPN 142 may comprise a merchant system 144 of a merchant engaging in the payment transaction, the merchant system 144 comprising the POS device 130. The EPPN 142 may comprise a transaction processing system 146 of a transaction service provider and an issuer system 146 of an issuer. The transaction service provider and issuer may be the transaction service provider and issuer associated with the payment device 100 of the user which initiated the payment transaction. The merchant system 144, transaction processing system 146, and issuer system 148 may co-act to process the payment transaction, such as to authorize, clear, and settle the payment transaction.

The systems 140 shown in FIGS. 4A-4B are similar, but have the differences as described hereinafter. The system 140 in FIG. 4A describes a non-limiting embodiment in which the biometric data 122 is collected from the user at the time of the payment transaction by the payment device 100, whereas the system 140 in FIG. 4B describes a non-limiting embodiment in which the biometric data 122 is collected from the user at the time of the payment transaction by the POS device 130. It will be appreciated that other systems that combine features of the systems 140 described in connection with FIGS. 4A-4B are also within the scope of this disclosure.

Referring to FIGS. 1, 2, and 4A, the payment device 100 may store biometric data of a primary user corresponding to the payment device 100 issued to the primary user by the issuer system 148. For example, the biometric sensor 108 of the payment device 100 (or any other biometric sensor) may collect biometric data 122 of the primary user and store the biometric data 122 on the data storage device 110, e.g., according to the onboarding process previously described. The onboarding process may be completed before a secondary user initiates a payment transaction with the payment device 100. In some non-limiting embodiments or aspects, the biometric data 122 collected during the onboarding process may additionally and/or alternatively be stored in a database of the transaction service provider and/or issuer (e.g., biometric database 150 from FIG. 4B).

After completion of the onboarding process, a secondary user may initiate a payment transaction with the merchant system 144 using the payment device 100. The payment transaction may be initiated at a merchant location or remotely from a merchant location (e.g., an e-commerce transaction). The secondary user may be a biological descendant of the primary user.

During processing of the payment transaction, the payment device 100 (e.g., the biometric sensor 108 thereof) may receive biometric data 122 of the secondary user who initiated the payment transaction. This may involve the secondary user engaging the biometric sensor 108 embedded on the payment device 100 during processing of the payment transaction (e.g., touching the fingerprint sensor 116 and/or arranging the face sensor 118 in front of the user's face). The biometric data 122 collected from the secondary user by the payment device 100 may or may not be stored on the data storage device 110. Biometric data 122 of the secondary user that is stored on the data storage device 110 may be used to authenticate subsequent payment transactions initiated by the secondary user.

In some non-limiting embodiments or aspects, the biometric sensor 108 may be a fingerprint sensor 116, wherein the biometric data 122 of the secondary user is received during the payment transaction by the secondary user placing a finger on the biometric sensor 108 to cause the biometric sensor 108 to collect the fingerprint data of the secondary user. This biometric data 122 may be collected at the point-of-sale (e.g., at the merchant location if the transaction is initiated at the merchant location or remote from the merchant location if the transaction is initiated remotely).

In some non-limiting embodiments or aspects, the biometric sensor 108 may be a face sensor 118, wherein the biometric data 122 of the secondary user is received during the payment transaction by the secondary user placing their face within sensing range of the biometric sensor 108 to cause the biometric sensor 108 to collect the facial data of the secondary user. This biometric data 122 may be collected at the point-of-sale (e.g., at the merchant location if the transaction is initiated at the merchant location or remote from the merchant location if the transaction is initiated remotely).

With continued reference to FIGS. 1, 2, and 4A, in response to receiving the biometric data 122 from the secondary user, the payment device 100 (e.g., the biometric algorithm thereof 124) may automatically generate a similarity score by executing the biometric algorithm 124 configured to compare the biometric data 122 of the secondary user collected during the payment transaction with the biometric sensor 108 to the biometric data 122 of the primary user stored on the data storage device 110. The biometric data 122 of the secondary user and the biometric data 122 of the primary user may be inputs to the biometric algorithm 124. The similarity score may represent a similarity between the biometric data 122 of the secondary user and the biometric data 122 of the primary user.

In response to the similarity score generated by the biometric algorithm 124 satisfying at least one threshold, the payment device 100 (e.g., the authentication processor 126) may automatically authenticate the payment transaction. The output of the biometric algorithm 124 may be an input to the authentication processor 126. In some non-limiting embodiments or aspects, the biometric algorithm 124 and the authentication processor 126 may be the same component or separate components. Authenticating the payment transaction may comprise the authentication processor 126 generating an indicator indicating whether the payment transaction has been authenticated. An authentication decision that the payment transaction has been authenticated may indicate a finding that the primary user and the secondary user are or are likely biologically related. An authentication decision that the payment transaction has not been authenticated may indicate a finding that the primary user and the secondary user are not or are not likely biologically related.

In some non-limiting embodiments or aspects, the payment transaction may be automatically processed to completion (e.g., authorized, cleared, settled) in response to the payment transaction being authenticated (e.g., by an authentication decision indicating that the payment transaction was successfully authenticated). The payment transaction may be processed to completion over the EPPN 142.

Processing the payment transaction over the EPPN 142 may comprise the payment device 100 communicating a transaction request message containing data fields comprising the payment data 120 to the POS device 130 (e.g. such as using the communication device 112 of the payment device 100). The transaction request message may comprise data associated with the account of the payment device 100 (e.g., the payment data 120) that enables processing of the payment transaction using the account of the payment device 100.

Processing the payment transaction over the EPPN 142 may comprise the payment device 100 communicating an authentication message containing data fields comprising the authentication decision (e.g., the indicator corresponding thereto) to the POS device 130 (e.g. such as using the communication device 112 of the payment device 100). The authentication message may contain biometric data 122. In response to the authentication message comprising the indicator that the payment transaction has been successfully authenticated, the EPPN 142 may automatically initiate processing of the payment transaction to completion.

In some non-limiting embodiments or aspects, the transaction request message and the authentication message may be the same message. In other non-limiting embodiments or aspects, the transaction request message and the authentication message may be separate messages. For example, the transaction request message and the authentication message may be sequentially transmitted from the payment device 100 to the POS device 130. For example, the transaction request message may first be transmitted to the POS device 130, and the authentication message may be transmitted after the biometric data 122 of the secondary user has been collected and the similarity score and authentication decision generated. In some non-limiting embodiments or aspects, the EPPN 142 may authorize the payment transaction based on the data contained in the transaction request message in parallel with the generation and transmission of the authentication message by the payment device 100. In some non-limiting embodiments or aspects, the payment device 100 may generate and transmit the authentication message in response to receiving a message from the POS device 130 that the payment transaction has been authorized (e.g., only execute the authentication protocol for already-authorized transactions).

With continued reference to FIGS. 1, 2, and 4A, in response to receiving the transaction request message and/or the authentication message, the merchant system 144 (e.g., the POS device 130 thereof) may generate a transaction message containing data fields containing at least a portion of the data from the transaction request message and/or the authentication message (e.g., at least a portion of the payment data 120, biometric data 122, authorization decision, or the like). The merchant system 144 may transmit the transaction message to the transaction processing system 146.

The transaction processing system 146, in response to receiving the transaction message, may automatically generate an authorization request message containing data fields containing at least a portion of the data from the transaction message needed to authorize the transaction. The transaction processing system 146 may communicate the authorization request message to the issuer system 148 to cause the issuer system 148 to generate an authorization decision.

In response to receiving the authorization request message, the issuer system 148 may generate an authorization decision for the payment transaction. The authorization decision may be to authorize, authorize in part, or decline the payment transaction based on the data contained in the authorization request message. The issuer system 148 may generate an authorization response message containing a data field containing the authorization decision. The issuer system 148 may communicate the authorization response message to the transaction processing system 146.

In response to receiving the authorization response message, the transaction processing system 146 may generate a transaction response containing a data field containing the authorization decision, and the transaction response may be communicated to the merchant system 144. The merchant system 144 may communicate the authorization decision to the payment device 100 and/or a user device of the user. The merchant system 144 may display the authorization decision on a user interface of the POS device 130.

The EPPN 142 may further process an authorized payment transaction to completion, such as by clearing and/or settling the payment transaction.

Referring to FIGS. 3 and 4B, the system 140 may process the payment transaction by collecting biometric data from the secondary user at the time of the payment transaction by the POS device 130.

A biometric database 150 may store biometric data (as previously defined) of a primary user corresponding to the payment device 100 issued to the primary user by the issuer system 148. In FIG. 4B, the biometric database 150 is shown as a database of the issuer system 148, but it will be appreciated that in other embodiments, the biometric database 150 may be a database of the transaction processing system 146, the merchant system 144, or any other entity of the EPPN 142. The biometric database 150 may store the biometric data of the primary user and the biometric algorithm (as previously described).

Biometric data 122 of the primary user may be collected by the system 140, and the biometric data stored in the biometric database 150. The biometric data of the primary user may be collected by a biometric sensor (not shown). In some non-limiting examples, the biometric data of the primary user may be collected by a biometric sensor on the user's device and/or by a device of the issuer system 148. This process of collecting the primary user's biometric data may be an onboarding process of the primary user. This onboarding process may be completed before a secondary user initiates a payment transaction with the payment device 100.

After completion of the onboarding process, a secondary user may initiate a payment transaction with the merchant system 144 using payment device 100. In some non-limiting embodiments, the payment device 100 may not have a biometric sensor and/or a biometric sensor of the payment device may not be used in processing the payment transaction. The payment transaction may be initiated at a merchant location or remotely from a merchant location (e.g., an e-commerce transaction). The payment transaction may be initiated at a merchant location using the POS device 130 located at the merchant location. The secondary user may be a biological descendant of the primary user.

During processing of the payment transaction, the POS device 130 (e.g., the biometric sensor 138 thereof) may receive biometric data of the secondary user who initiated the payment transaction. This may involve the secondary user engaging the biometric sensor 138 of the POS device 130 during processing of the payment transaction (e.g., touching the fingerprint sensor and/or arranging the face sensor in front of their face).

In some non-limiting embodiments or aspects, the biometric sensor 138 may be a fingerprint sensor, wherein the biometric data of the secondary user is received during the payment transaction by the secondary user placing a finger on the biometric sensor 138 of the POS device 130 of the merchant system 144 to cause the biometric sensor 138 to collect the fingerprint data of the secondary user.

In some non-limiting embodiments or aspects, the biometric sensor 138 may be a face sensor, wherein the biometric data of the secondary user is received during the payment transaction by the secondary user placing their face within sensing range of the biometric sensor 138 of the POS device 130 of the merchant system 144 to cause the biometric sensor 138 to collect the facial data of the secondary user.

With continued reference to FIGS. 3 and 4B, in response to receiving the biometric data from the secondary user, POS device 130 may generate and transmit an authentication request message. The authentication request message may contain data fields containing at least a portion of the biometric data of the secondary user received by the biometric sensor 138. The authentication request message may be transmitted to the transaction processing system 146 and/or the issuer system 148, and the transaction processing system 146 and/or the issuer system 148 may analyze the biometric data. In the non-limiting example, of FIG. 4B, the authentication request message may be transmitted to the issuer system 148 through the transaction processing system 146, and the issuer system 148 may analyze the biometric data.

In response to receiving the authentication request message, the issuer system 148 (and/or the transaction processing system 146, which will be understood throughout) may automatically generate a similarity score by executing the biometric algorithm configured to compare the biometric data of the secondary user collected during the payment transaction with the biometric sensor 138 to the biometric data of the primary user stored in the biometric database 150. The biometric data of the secondary user and the biometric data of the primary user may be inputs to the biometric algorithm. The similarity score may represent a similarity between the biometric data of the secondary user and the biometric data of the primary user.

In response to the similarity score generated by the biometric algorithm satisfying at least one threshold, the issuer system 148 may automatically authenticate the payment transaction. Authenticating the payment transaction may comprise the issuer system 148 generating an indicator indicating whether the payment transaction has been authenticated. An authentication decision that the payment transaction has been authenticated may indicate a finding that the primary user and the secondary user are or are likely biologically related. An authentication decision that the payment transaction has not been authenticated may indicate a finding that the primary user and the secondary user are not or are not likely biologically related.

The issuer system 148 may generate an authentication response message comprising a data field containing the indicator, and the issuer system 148 may transmit the authentication decision to the POS device 130.

In some non-limiting embodiments or aspects, the payment transaction may be automatically processed to completion (e.g., authorized, cleared, settled) in response to the payment transaction being authenticated (e.g., by an authentication decision indicating that the payment transaction was successfully authenticated). The payment transaction may be processed to completion over the EPPN 142.

Processing the payment transaction over the EPPN 142 may comprise the payment device 100 communicating a transaction request message containing data fields comprising the payment data 120 (from FIG. 2) to the POS device 130 (e.g. such as using the communication device 112 of the payment device 100 described in FIG. 2). The transaction request message may comprise data associated with the account of the payment device 100 (e.g., the payment data 120) that enables processing of the payment transaction using the account of the payment device 100.

With continued reference to FIGS. 3 and 4B, in response to receiving the transaction request message, the merchant system 144 (e.g., the POS device 130) may generate a transaction message containing data fields containing at least a portion of the data from the transaction request message (e.g., at least a portion of the payment data 120). The merchant system 144 may transmit the transaction message to the transaction processing system 146.

The transaction processing system 146, in response to receiving the transaction message, may automatically generate an authorization request message containing data fields containing at least a portion of the data from the transaction message need to authorize the transaction. The transaction processing system 146 may communicate the authorization request message to the issuer system 148 to cause the issuer system 148 to generate an authorization decision.

In response to receiving the authorization request message, the issuer system 148 may generate an authorization decision for the payment transaction. The authorization decision may be to authorize, authorize in part, or decline the payment transaction based on the data contained in the authorization request message. The issuer system 148 may generate an authorization response message containing a data field containing the authorization decision. The issuer system 148 may communicate the authorization response message to the transaction processing system 146.

In response to receiving the authorization response message, the transaction processing system 146 may generate a transaction response containing a data field containing the authorization decision, and the transaction response may be communicated to the merchant system 144. The merchant system 144 may communicate the authorization decision to the payment device 100 and/or a user device of the user. The merchant system 144 may display the authorization decision on a user interface of the POS device 130.

The EPPN 142 may further process an authorized payment transaction to completion, such as by clearing and/or settling the payment transaction.

In some non-limiting embodiments or aspects, the transaction message and the authentication request message transmitted by the POS device 130 to the issuer system 148 may be the same message, such that authorization and authentication can be executed by the issuer system 148 at the same time. In other non-limiting embodiments or aspects, the transaction message and the authentication request message may be separate messages. For example, the transaction message and authentication request message may be sequentially transmitted from the POS device 130 to the issuer system 148. For example, the transaction message may first be transmitted to the issuer system 148, and the authentication request message may be transmitted after payment transaction has been authorized. Alternatively the authentication request message may first be transmitted to the issuer system 148, and the transaction message may be transmitted after the payment transaction has been authenticated.

Figure 5A:
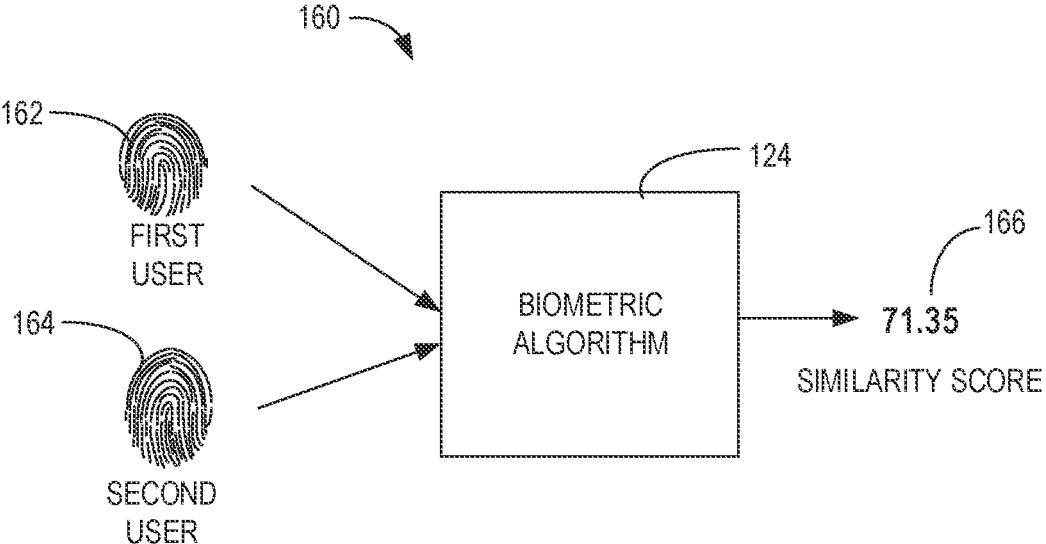
FIGS. 5A-5B are schematic diagrams of systems for executing a biometric algorithm according to some non-limiting embodiments or aspects.
Figure 5B:
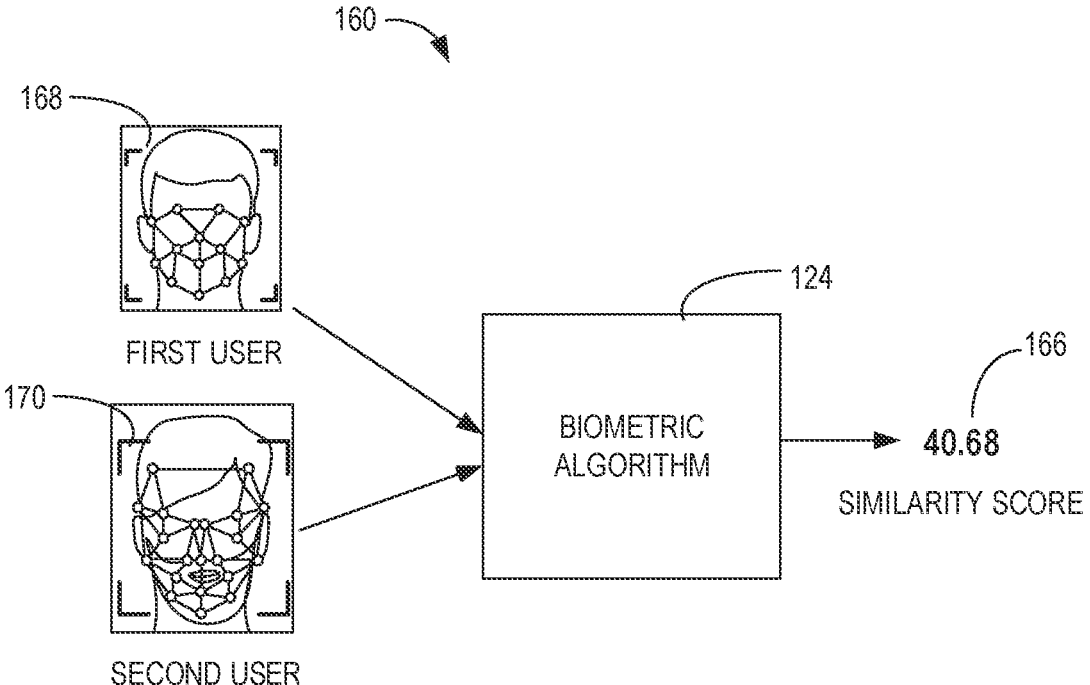

Referring to FIGS. 5A-5B, systems 160 for analyzing biometric data are shown, according to some non-limiting embodiments or aspects. The systems 160 shown in FIGS. 5A-5B are similar, but have the differences as described hereinafter. The system 160 in FIG. 5A describes a non-limiting embodiment in which the biometric data analyzed is fingerprint data corresponding to user fingerprints, whereas the system 160 in FIG. 5B describes a non-limiting embodiment in which the biometric data analyzed is facial data corresponding to user faces. It will be appreciated that other systems that combine features of the systems 160 described in connection with FIGS. 5A-5B are also within the scope of this disclosure.

Referring to FIG. 5A, the system 160 comprises the biometric algorithm 124 as previously described. Fingerprint data comprising fingerprint data of the primary user 162 and fingerprint data of the secondary user 164 may be input to the biometric algorithm 124. The biometric algorithm may be executed to compare the fingerprint data 162, 164 of the users to generate the similarity score 166. The biometric algorithm 124 executed may be any of the previously described algorithms or any other suitable biometric algorithms for comparing fingerprints to generate a representation of a similarity between two or more fingerprints.

In some non-limiting embodiments or aspects, the fingerprint data 162, 164 may comprise images of the fingerprints of the users. Executing the biometric algorithm 124 may comprise automatically comparing the images of the fingerprints of the users to generate the similarity score 166. However, it will be appreciated that other representations of the fingerprints (other than images) may be used by the biometric algorithm 124 to generate the similarity score 166.

The biometric algorithm 124 may be executed to compare the fingerprint data 162, 164 during processing of the payment transaction initiated by the secondary user, in order to authenticate or not authenticate that the secondary user as biologically related to the primary user (e.g., based on biometric similarity of the biometric data of the primary and secondary users). The biometric algorithm 124 may be executed immediately preceding, simultaneous to, or immediately following authorization of the payment transaction by the issuer system. The biometric algorithm 124 may be executed at the time the secondary user is engaging with the point-of-sale (e.g., the POS device 130 or a remote point-of-sale) with the payment device 100.

The fingerprint data 162, 164 may be input to the biometric algorithm 124, which may automatically compare the inputted fingerprint data 162, 164 of the users to generate the similarity score 166. The similarity score 166 may be a representation of a similarity between the fingerprint data 162, 164. The similarity score 166 may be in any suitable format to represent (e.g., quantitatively and/or qualitatively) the similarity between the fingerprint data 162, 164. As shown in FIG. 5A, the similarity score 166 may be a numerical representation of the similarity between the fingerprint data 162, 164, such as on a 0-100 scale, 0-10 score, and/or the like. However, it will be appreciated that other forms of similarity score 166 representing the similarity between the fingerprint data 162, 164 may be the output of the biometric algorithm 124, such as an alphabetical grade, a label ("biological relation" or "not a biological relation"), or a binary return value (e.g., 1 represents a "biological relation" and 0 represents "not a biological relation").

A threshold may be established by the system 160 for determining whether the output of the biometric algorithms 124 corresponds to the primary user and secondary user being labeled as a "biological relation" or "likely biological relation" or "not a biological relation" or "unlikely biological relation". For example, the threshold may correspond to a numerical value above or below which the two users are determined to be "biological relations" or "likely biological relations".

Referring to FIG. 5B, the system 160 comprises the biometric algorithm 124 as previously described. Facial data comprising facial data of the primary user 168 and facial data of the secondary user 170 may be input to the biometric algorithm 124. The biometric algorithm 124 may be executed to compare the facial data 168, 170 of the users to generate the similarity score 166. The biometric algorithm 124 executed may be any of the previously described algorithms or any other suitable biometric algorithms for comparing faces to generate a representation of a similarity between two or more faces.

In some non-limiting embodiments or aspects, the facial data 168, 170 may comprise images of the faces of the users. Executing the biometric algorithm 124 may comprise automatically comparing the images of the faces of the users to generate the similarity score 166. However, it will be appreciated that other representations of the faces (other than images) may be used by the biometric algorithm 124 to generate the similarity score 166.

The biometric algorithm 124 may be executed to compare the facial data 168, 170 during processing of the payment transaction initiated by the secondary user, in order to authenticate or not authenticate that the secondary user is biologically related to the primary user (e.g., based on biometric similarity of the biometric data of the primary and secondary user). The biometric algorithm 124 may be executed immediately preceding, simultaneous to, or immediately following authorization of the payment transaction by the issuer system. The biometric algorithm 124 may be executed at the time the secondary user is engaging with the point-of-sale (e.g., the POS device 130 or a remote point-of-sale) with the payment device 100.

The facial data 168, 170 may be input to the biometric algorithm 124, which may automatically compare the inputted facial data 168, 170 of the users to generate the similarity score 166. The similarity score 166 may be a representation of a similarity between the facial data 168, 170. The similarity score 166 may be in any suitable format to represent (e.g., quantitatively and/or qualitatively) the similarity between the facial data 168, 170. As shown in FIG. 5B, the similarity score 166 may be a numerical representation of the similarity between the facial data 168, 170, such as on a 0-100 scale, 0-10 score, and/or the like. However, it will be appreciated that other forms of similarity score 166 representing the similarity between the facial data 168, 170 may be the output of the biometric algorithm 124, such as an alphabetical grade, a label ("biological relation" or "not a biological relation"), or a binary return value (e.g., 1 represents a "biological relation" and 0 represents "not a biological relation").

A threshold may be established by the system 160 for determining whether the output of the biometric algorithms 124 corresponds to the primary user and secondary user being labeled as a "biological relation" or "likely biological relation" or "not a biological relation" or "unlikely biological relation". For example, the threshold may correspond to a numerical value above or below which the two users are determined to be "biological relations" or "likely biological relations".

Figure 6:
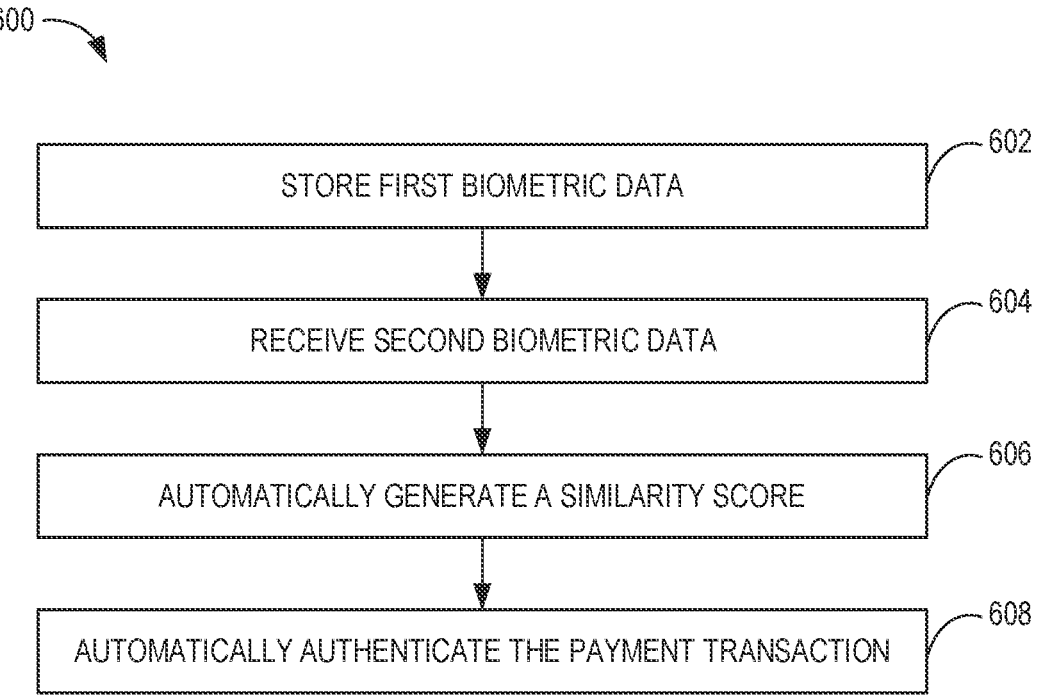
FIG. 6 is a step diagram of a method for authenticating transactions using biometric data according to some non-limiting embodiments or aspects.

Referring to FIG. 6, a method 600 is shown for authenticating transactions using biometric data, according to some non-limiting embodiments or aspects. It will be appreciated that one or more steps of method 600 may be executed automatically and/or in response to a preceding step. Further, non-limiting embodiments may include additional, fewer, and/or a different order of steps.

At a step 602, the method 600 may comprise storing first biometric data associated with a first user (e.g., the primary user) corresponding to a payment device issued by an issuer system. In some non-limiting embodiments or aspects, the first biometric data may be stored on the data storage device 110 of the payment device 100 (see FIG. 1) and/or the biometric database 150 (see FIG. 4B).

At a step 604, the method 600 may comprise, during a payment transaction initiated with the payment device by a second user (e.g., the secondary user) different from the first user, receiving second biometric data associated with the second user. In some non-limiting embodiments or aspects, the second biometric data may be received by the biometric sensor 108 of the payment device 100 (see FIG. 1) and/or the biometric sensor 138 of the POS device 130 (see FIG. 3).

At a step 606, the method 600 may comprise, in response to receiving the second biometric data, automatically generating a similarity score by executing a biometric algorithm configured to compare the second biometric data to the first biometric data, the similarity score representing a similarity between the second biometric data and the first biometric data. In some non-limiting embodiments or aspects, generating the similarity score may be executed by a component of the payment device 100 (see FIGS. 1-2) or the issuer system 148 (see FIG. 4B).

At a step 608, the method 600 may comprise, in response to the similarity score satisfying at least one threshold, automatically authenticating the payment transaction. In some non-limiting embodiments or aspects, automatically authenticating the payment transaction may be executed by a component of the payment device 100 (see FIGS. 1-2) or the issuer system 148 (see FIG. 4B).

In some non-limiting embodiment or aspects, a computer program product for authenticating a transaction using biometric data includes at least one non-transitory computer-readable medium including program instructions that, when executed by at least one processor, cause the at least one processor to execute one of the previously-described methods. The at least one processor may include any of the components shown in FIGS. 1-5B (e.g., the payment device 100, merchant POS device 130, merchant system 144, transaction processing system 146, issuer system 148, and the like).

Figure 7:
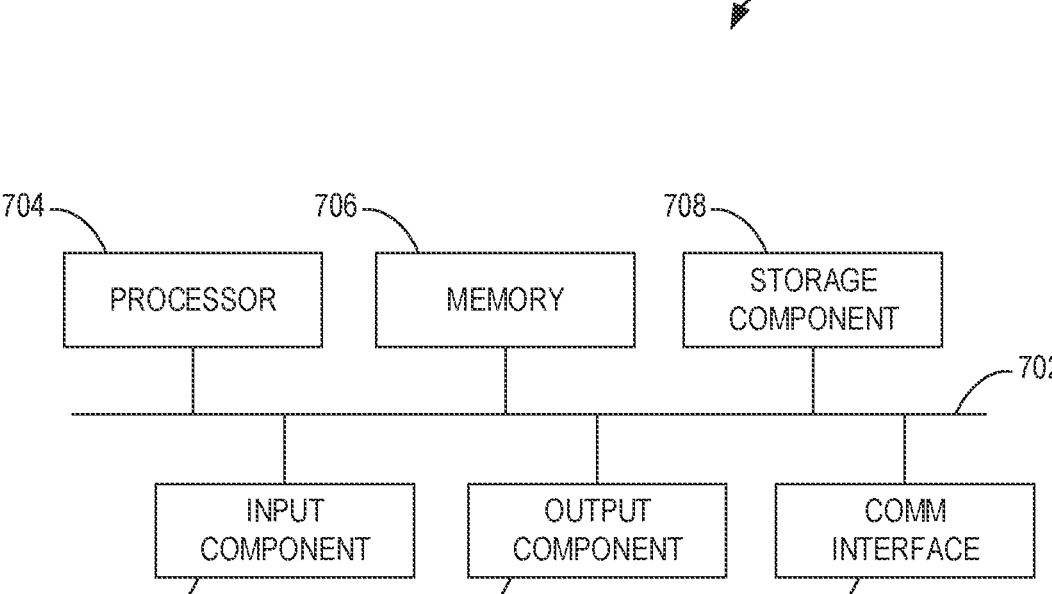
FIG. 7 illustrates example components of a device used in connection with non-limiting embodiments or aspects.

Referring to FIG. 7, shown is a diagram of example components of a device 700 according to non-limiting embodiments or aspects. Device 700 may correspond to any of the payment device 100, merchant POS device 130, merchant system 144, transaction processing system 146, and/or issuer system 148 shown in FIGS. 1-5B, as an example. In some non-limiting embodiments or aspects, such systems or devices may include at least one device 700 and/or at least one component of device 700. The number and arrangement of components shown are provided as an example. In some non-limiting embodiments or aspects, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

As shown in FIG. 7, device 700 may include a bus 702, a processor 704, memory 706, a storage component 708, an input component 710, an output component 712, and a communication interface 714. Bus 702 may include a component that permits communication among the components of device 700. In some non-limiting embodiments or aspects, processor 704 may be implemented in hardware, firmware, or a combination of hardware and software. For example, processor 704 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 706 may include random access memory (RAM), read only memory (ROM), and/or another type of dynamic or static storage device (e.g., flash memory, magnetic memory, optical memory, etc.) that stores information and/or instructions for use by processor 704.

With continued reference to FIG. 7, storage component 708 may store information and/or software related to the operation and use of device 700. For example, storage component 708 may include a hard disk (e.g., a magnetic disk, an optical disk, a magneto-optic disk, a solid state disk, etc.) and/or another type of computer-readable medium. Input component 710 may include a component that permits device 700 to receive information, such as via user input (e.g., a touch screen display, a keyboard, a keypad, a mouse, a button, a switch, a microphone, etc.). Additionally, or alternatively, input component 710 may include a sensor for sensing information (e.g., a global positioning system (GPS) component, an accelerometer, a gyroscope, an actuator, etc.). Output component 712 may include a component that provides output information from device 700 (e.g., a display, a speaker, one or more light-emitting diodes (LEDs), etc.). Communication interface 714 may include a transceiver-like component (e.g., a transceiver, a separate receiver and transmitter, etc.) that enables device 700 to communicate with other devices, such as via a wired connection, a wireless connection, or a combination of wired and wireless connections. Communication interface 714 may permit device 700 to receive information from another device and/or provide information to another device. For example, communication interface 714 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 700 may perform one or more processes described herein. Device 700 may perform these processes based on processor 704 executing software instructions stored by a computer-readable medium, such as memory 706 and/or storage component 708. A computer-readable medium may include any non-transitory memory device. A memory device includes memory space located inside of a single physical storage device or memory space spread across multiple physical storage devices. Software instructions may be read into memory 706 and/or storage component 708 from another computer-readable medium or from another device via communication interface 714. When executed, software instructions stored in memory 706 and/or storage component 708 may cause processor 704 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:

storing, on a data storage device comprising a non-volatile memory embedded in a physical payment card, first biometric data associated with a first user corresponding to the payment card issued by an issuer system;

storing, on the data storage device, a biometric inheritance algorithm;

during a payment transaction initiated with the payment card by a second user different from the first user, receiving, with a biometric sensor embedded in the payment card, second biometric data associated with the second user, the second user a biological descendant of the first user, the second biometric data received by the second user engaging with the biometric sensor of the payment card during the payment transaction;

storing, on the data storage device, the second biometric data;

in response to receiving the second biometric data, automatically generating, with an authentication processor embedded in the payment card, a similarity score by executing the biometric inheritance algorithm to compare the first biometric data stored on the data storage device with the second biometric data received by the biometric sensor, the similarity score representing a similarity between the second biometric data and the first biometric data;

in response to the similarity score satisfying at least one threshold, automatically authenticating, with the authentication processor of the payment card, the payment transaction;

transmitting, with a communication device embedded in the payment card, a transaction request message to an electronic payment network to cause the electronic payment network to process the payment transaction, the transaction request message containing payment data associated with the payment card and an indicator that the payment card authenticated the payment transaction;

during a second payment transaction initiated with the payment card by the second user after processing of the payment transaction, receiving, with the biometric sensor, third biometric data associated with the second user, the third biometric data received by the second user engaging with the biometric sensor of the payment card during the second payment transaction;

automatically authenticating, with the authentication processor of the payment card, the third biometric data based on the second biometric data stored on the data storage device; and transmitting, with the communication device, a second transaction request message to the electronic payment network to cause the electronic payment network to process the second payment transaction, the second transaction request message containing payment data associated with the payment card and a second indicator that the payment card authenticated the second payment transaction.

2. The computer-implemented method of claim 1, wherein the first biometric data and/or the second biometric data comprises fingerprint data.

3. The computer-implemented method of claim 1, wherein the first biometric data comprises an image of a fingerprint of the first user, wherein the second biometric data comprises an image of a fingerprint of the second user, and wherein executing the biometric inheritance algorithm comprises automatically comparing the images of the fingerprint of the first user and the fingerprint of the second user to generate the similarity score.

4. The computer-implemented method of claim 1, wherein the second biometric data is received by the second user placing a finger on the biometric sensor to cause the biometric sensor to collect the second biometric data at a point of sale of the payment transaction.

5. The computer-implemented method of claim 1, wherein the payment transaction is automatically processed to completion over a payment network in response to the payment transaction being authenticated.

6. The computer-implemented method of claim 1, wherein the first biometric data and/or the second biometric data comprise facial data.

7. The computer-implemented method of claim 1, wherein the first biometric data comprises an image of a face of the first user, and the second biometric data comprises an image of a face of the second user, wherein executing the biometric algorithm comprises automatically comparing the images of the face of the first user and the face of the second user to generate the similarity score.

8. A payment card issued to a first user, the payment card configured to initiate electronic payment transactions and comprising:

a physical card comprising:

a biometric sensor embedded in the card, the biometric sensor configured to collect biometric data from a second user engaging with the biometric sensor during a payment transaction initiated with the payment card by the second user different from the first user, the second user a biological descendant of the first user;

a data storage device comprising a non-volatile memory embedded in the card, the data storage device storing an identifier of the payment card, first biometric data associated with the first user; and a biometric inheritance algorithm configured to compare biometric data;

an authentication processor embedded in the card; and a communication device embedded in the card, the communication device for initiating an electronic payment transaction with a point of sale device of a merchant system by communicating a message comprising the identifier to the point of sale device, wherein in response to receiving the second biometric data, the payment card is configured to store the second biometric data on the data storage device and automatically generate, with the authentication processor, a similarity score by executing the biometric inheritance algorithm to compare the first biometric data stored on the data storage device with the second biometric data received by the biometric sensor, the similarity score representing a similarity between the second biometric data and the first biometric data;

wherein in response to the similarity score satisfying at least one threshold, the authentication processor of the payment card is configured to automatically authenticate the payment transaction; and wherein the payment card is configured to, using the communication device, transmit a transaction request message to the electronic payment network to cause the electronic payment network to process the payment transaction, the transaction request message containing payment data associated with the payment card and an indicator that the payment card authenticated the payment transaction, wherein during a second payment transaction initiated with the payment card by the second user after processing of the payment transaction the payment card is configured to:

receive, with the biometric sensor, third biometric data associated with the second user, the third biometric data received by the second user engaging with the biometric sensor of the payment card during the second payment transaction;

automatically authenticate, with the authentication processor, the third biometric data based on the second biometric data stored on the data storage device; and transmit, with the communication device, a second transaction request message to the electronic payment network to cause the electronic payment network to process the second payment transaction, the second transaction request message containing payment data associated with the payment card and a second indicator that the payment card authenticated the second payment transaction.

9. The payment card of claim 8, wherein the biometric sensor comprises a fingerprint sensor and/or a face sensor.

10. The payment card of claim 8, wherein the biometric algorithm comprises a biometric inheritance algorithm.

11. The payment card of claim 8, wherein the first biometric data comprises an image of a fingerprint of the first user, wherein the second biometric data comprises an image of a fingerprint of the second user, and wherein executing the biometric inheritance algorithm comprises automatically comparing the images of the fingerprint of the first user and the fingerprint of the second user to generate the similarity score.

12. A system comprising a physical payment card comprising a data storage device comprising a non-volatile memory embedded in the payment card, the payment card configured to:

store first biometric data on the data storage device, the first biometric data associated with a first user corresponding to the payment card issued by an issuer system;

store a biometric inheritance algorithm on the data storage device;

during a payment transaction initiated with the payment card by a second user different from the first user, receive, with a biometric sensor of the payment card, second biometric data associated with the second user, the second user a biological descendant of the first user, the second biometric data received by the second user engaging with the biometric sensor of the payment card during the payment transaction;

store the second biometric data on the data storage device;

in response to receiving the second biometric data, automatically generate, with an authentication processor embedded in the card, a similarity score by executing the biometric inheritance algorithm to compare the first biometric data stored on the data storage device with the second biometric data received by the biometric sensor, the similarity score representing a similarity between the second biometric data and the first biometric data;

in response to the similarity score satisfying at least one threshold, automatically authenticate, with the authentication processor, the payment transaction;

transmit a transaction request message to an electronic payment network to cause the electronic payment network to process the payment transaction, the transaction request message containing payment data associated with the payment card and an indicator that the payment card authenticated the payment transaction;

during a second payment transaction initiated with the payment card by the second user after processing of the payment transaction, receive, with the biometric sensor, third biometric data associated with the second user, the third biometric data received by the second user engaging with the biometric sensor of the payment card during the second payment transaction;

automatically authenticate, with the authentication processor, the third biometric data based on the second biometric data stored on the data storage device; and transmit, with the communication device, a second transaction request message to the electronic payment network to cause the electronic payment network to process the second payment transaction, the second transaction request message containing payment data associated with the payment card and a second indicator that the payment card authenticated the second payment transaction.

* * * * *